(12) United States Patent  
Reves Balleste et al.

(10) Patent No.: US 9,350,419 B2  
(45) Date of Patent: May 24, 2016

(54) COORDINATING TRANSMISSIONS OF POWER LINE COMMUNICATION (PLC) DEVICES

(71) Applicant: BROADCOM CORPORATION, Irvine, CA (US)

(72) Inventors: Xavier Josep Reves Balleste, Barcelona (ES); Yue Sun, Shanghai (CN); Miguel Philippe Paul Peeters, Woluwe-Saint-Pierre (BE); Zacarias Iracheta Todo, Barcelona (ES); Toby Edward Ralph Bailey, Innerleithen (GB)

(73) Assignee: Broadcom Corporation, Irvine, CA (US)

( * ) Notice: Subject to any disclaimer, the term of this patent is extended or adjusted under 35 U.S.C. 154(b) by 187 days.

(21) Appl. No.: 14/086,945

(22) Filed: Nov. 21, 2013

(65) Prior Publication Data

US 2014/0146657 A1 May 29, 2014

Related U.S. Application Data

(60) Provisional application No. 61/730,916, filed on Nov. 28, 2012.

(51) Int. Cl.
*H04B 3/32* (2006.01)
*H04B 3/54* (2006.01)
*H04L 25/03* (2006.01)

(52) U.S. Cl.
CPC .................. *H04B 3/32* (2013.01); *H04B 3/542* (2013.01); *H04L 25/03343* (2013.01)

(58) Field of Classification Search
CPC ............ H04B 3/00; H04B 3/32; H04B 3/542; H04L 25/03343
See application file for complete search history.

(56) References Cited

U.S. PATENT DOCUMENTS 7,542,528 B1 6/2009 Cheong
8,111,637 B2 2/2012 Kozek et al.
(Continued)

FOREIGN PATENT DOCUMENTS

CN 102577292 A 7/2012
CN 102687436 A 9/2012
WO WO-2012/041424 A1 4/2012

OTHER PUBLICATIONS

International Telecommuncation Union Recommendation ITU-T G.993.5, "Self-FEXT cancellation (vectoring) for use with VDSL2 transceivers," Apr. 2010.

(Continued)

*Primary Examiner* — Andrew Lai
*Assistant Examiner* — Sumitra Ganguly
(74) *Attorney, Agent, or Firm* — McDermott Will & Emery LLP

(57) ABSTRACT

A system for coordinating transmissions of power line communication (PLC) devices may include a processor and a memory. The processor may be configured to receive channel state information (CSI) from primary PLC devices. The primary PLC devices may be communicatively coupled to secondary PLC devices via collocated power lines, such as bundled power lines. Thus, the transmission of a primary PLC device over a power line to a secondary PLC device may be electromagnetically coupled onto the other power lines, thereby causing far-end crosstalk (FEXT) interference with respect to other secondary PLC devices. The processor may be configured to determine precoding information for compensating for the FEXT interference based at least on the received CSI. The processor may be configured to provide at least a portion of the precoding information to the primary PLC devices and to coordinate precoded transmissions of the primary PLC devices to mitigate the FEXT interference.

20 Claims, 6 Drawing Sheets

(56) References Cited

U.S. PATENT DOCUMENTS

| | | | |
|---|---|---|---|
| 8,537,655 B2 | 9/2013 | Nuzman et al. | |
| 8,576,690 B2 * | 11/2013 | Pierrugues | H04B 3/32 370/201 |
| 2005/0052988 A1 | 3/2005 | Tsatsanis et al. | |
| 2006/0179000 A1 * | 8/2006 | Aihara | H04L 63/0428 705/52 |
| 2011/0235759 A1 | 9/2011 | Pierrugues et al. | |
| 2011/0255576 A1 | 10/2011 | Chen et al. | |
| 2011/0256840 A1 * | 10/2011 | Kobayashi | H04W 56/002 455/130 |
| 2012/0082118 A1 * | 4/2012 | Long | H04B 7/024 370/329 |
| 2012/0307917 A1 * | 12/2012 | Goldhamer | H04B 3/32 375/257 |

OTHER PUBLICATIONS

International Telecommuncation Union Recommendation ITU-T G.9963, "Unified high-speed wireline-based home networking transceivers—Multiple input/umultiple output specification," Dec. 2011.
Vu, et al., "MIMO Wireless Linear Precoding," IEEE Signal Processing Magazine, Sep. 2007, pp. 86-105.
Becker, "Precoding and Spatially Multiplexed MIMO in 3GPP Long-Term Evolution," High Frequency Electronics, 2009, pp. 18-26.
Weikert, et al., "Efficient MIMO Channel Estimation With Optimal Training Sequences," 14th IEEE International Symposium on Power Line Communications and its Applications, 2010, www.hsu-hh.de/download-1.4.1.php?brick_id=GMaN37IYM6bgtJD8.
Hashmat, et al., "MIMO Communications for Inhome PLC Networks: Measurements and Results up to 100 MHz," IEEE Symposium on Power Line Communications and its Applications, Mar. 2010, http://hal.archives-ouvertes.fr/docs/00/48/67/51/PDF/ISPLC2010.pdf.
Egan, "Multiple Input, Mulitple Ouptut Technology Accelerates Wired Home Networks," HomeGrid Forum White Paper, Jun. 2012.
Schneider, et al., "Precoded Spatial Multiplexing MIMO for Inhome Power Line Communications," IEEE Globecom 2008.
Aldana, et al., "Channel Estimation for Multicarrier Multiple Input, Single Output Systems using the EM Algorithm," IEEE Trans. Signal Process, 2003, http://www.ugcs.caltech.edu/~aldana/TransSP.pdf.
Ginis, et al., "Vectored Transmission for Digital Subscriber Line Systems," IEEE Journal on Selected areas in Communicagtions, Jun. 2002, vol. 20, No. 5, pp. 1085-1104.
Ginis, et al., "Vectored DSL to the Rescue," OSP Magazine, Apr. 2010.
Ginis, et al., "Vectored Transmission for Digital Subsriber Line Systems," Submitted to IEEE JSAC Special Issue on Twisted Pair Trnasmission, Mar. 31, 2001.
Ginis, et al., "A Multi-User Precoding Scheme achieving Crosstalk Cancellation with Application to DSL Systems," ConferenceonSignals,Systems,andComputers,vol. 2,pp. 1627-1631, Oct. 2000.
"Singular Value Decomposition," From Wikipedia, the free encylopedia, Oct. 17, 2013.
"Precoding", From Wikipedia, the free encyclopeda, Jul. 10, 2013.
"MIMO," From Wikipedia, the free encyclopeda, Oct. 25, 2013.

* cited by examiner

COORDINATING TRANSMISSIONS OF POWER LINE COMMUNICATION (PLC) DEVICES

CROSS-REFERENCE TO RELATED APPLICATIONS

The present application claims the benefit of U.S. Provisional Patent Application Ser. No. 61/730,916, entitled "Precoding-Based Self-Crosstalk Cancellation in Powerline Communications," filed on Nov. 28, 2012, which is hereby incorporated by reference in its entirety for all purposes.

TECHNICAL FIELD

The present description relates generally to coordinating transmissions of power line communication (PLC) devices, and more particularly, but not exclusively, to precoding transmissions of PLC devices to compensate for self far-end crosstalk (FEXT).

BACKGROUND

Power line communication (PLC) devices carry data on a conductor that is also used simultaneously for AC electric power transmission or electric power distribution. PLC devices operate by impressing a modulated carrier signal on the wiring system. For example, a PLC network may be used by an Internet service provider (ISP) to distribute Internet service throughout a building, such as an apartment building, via the power lines of the building. The ISP may install primary PLC devices for each apartment in a common area of the apartment building, such as a basement. The primary PLC devices may be coupled to an external Internet connection. The primary PLC devices may also be coupled to internal power lines that provide power to each apartment. For example, the internal power lines may be bundled into a single conduit and then distributed throughout the building to the various apartments.

Secondary PLC devices may be installed in each apartment and each secondary PLC device may be communicatively coupled to one of the primary PLC devices via the internal power lines. The primary PLC devices may distribute the Internet connection over the internal power lines to the secondary PLC devices, and the secondary PLC devices may distribute the Internet to networked devices throughout each apartment. Thus, each of the primary PLC devices forms a PLC network with at least one of the secondary PLC devices over the internal power lines. However, since the internal power lines may be bundled into a single conduit, the PLC devices may experience a significant amount of interference from crosstalk arising from electromagnetic coupling between the power lines. Thus, the transmissions of the different PLC networks may interfere with one another due to the proximity of the wires carrying the transmissions.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
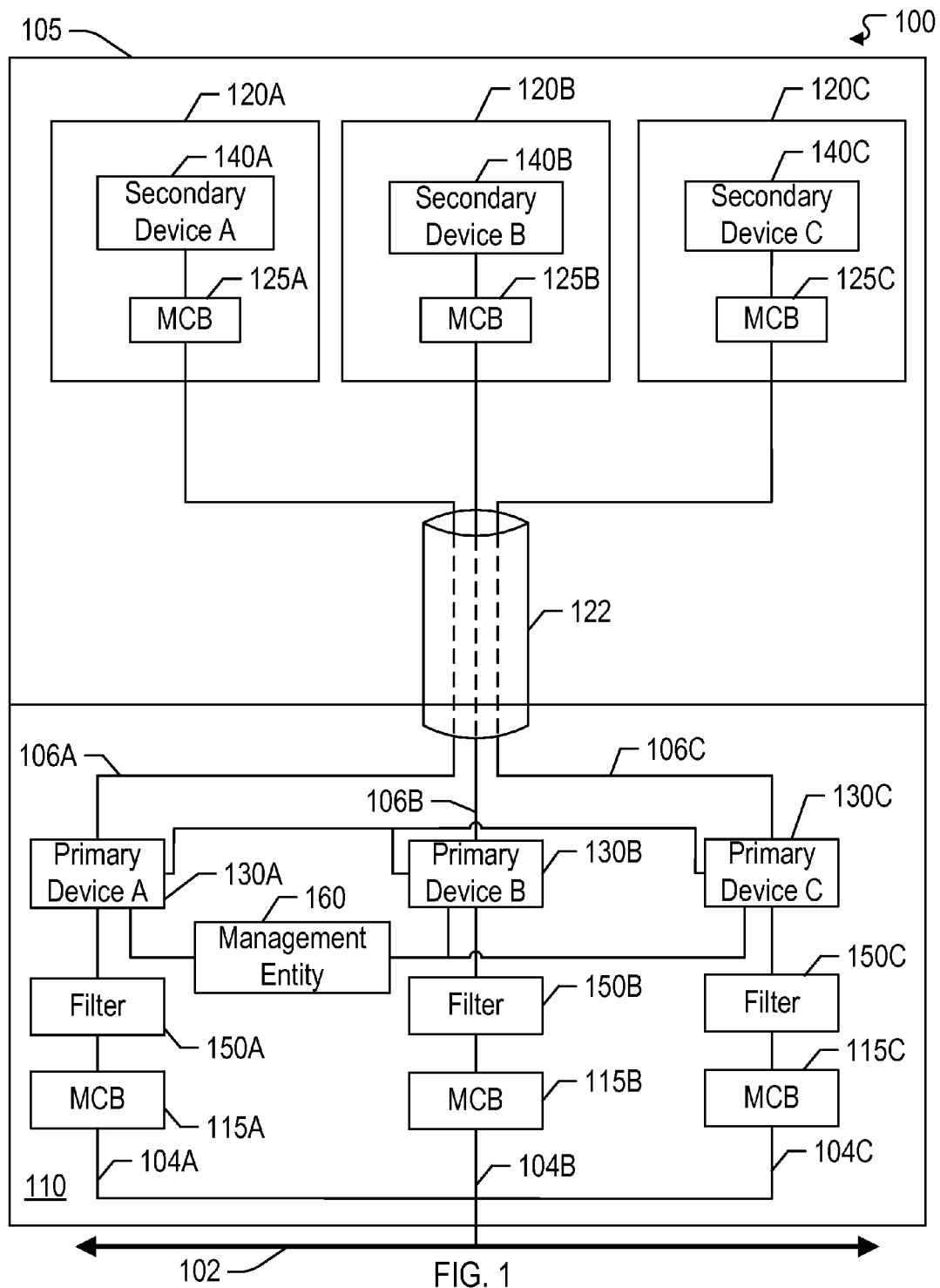
FIG. 1 illustrates an example power line network environment in which a system for coordinating transmissions of power line communication (PLC) devices may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Power line communication (PLC) devices that transmit PLC signals over power lines may form a PLC network. If any portion of the power lines that carry the PLC signals of the PLC network are located proximally to other power lines that carry other PLC signals, e.g. PLC signals corresponding to a different PLC network, far-end crosstalk (FEXT) interference may arise from electromagnetic coupling between the power lines. However, if the transmitting PLC devices and/or the receiving PLC devices of the different PLC networks are proximally located, the transmission of the PLC signals by the PLC devices of the different PLC networks may be coordinated, such as by a management entity, such that the crosstalk can be compensated for, cancelled, and/or avoided. In one or more implementations, the management entity may be separate from the PLC devices, or the management entity may be included in one or more of the PLC devices.

In one or more implementations, primary PLC devices may be collocated within a building, such as in a basement of an apartment building or a multi-dwelling unit (MDU), and may transmit PLC signals to secondary PLC devices over power lines that are proximally located, such as within a conduit that carries the power lines from the basement of the building to the apartments. The primary PLC devices may receive channel state information from the secondary PLC devices, and the primary PLC devices may provide the channel state information to the management entity. The management entity may determine precoding information, such as a precoding matrix, based at least in part on the received channel state information, and the management entity may provide at least a portion of the precoding information to the primary PLC devices. The primary PLC devices may apply the precoding information to PLC signals in order to compensate for the expected FEXT interference before the signals are transmitted, such as by subtracting the expected FEXT interference from the PLC signals before they are transmitted, and/or in order to perform orthogonal beamforming, such as eigen beamforming. In this manner, the subject system coordinates the transmissions of PLC devices such that signal degradation from FEXT interference is avoided.

FIG. 1 illustrates an example power line network environment 100 in which a system for coordinating transmissions of power line communication (PLC) devices may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example power line network environment 100 includes a common power line 102, and a building 105, such as an apartment building, an office building, a multi-dwelling unit, or generally any building for which it may be desirable to communicatively couple devices over power lines. The building 105 may include a common area 110, such as a basement or a utility closet, one or more units 120A-C, such as apartments, offices, condominiums, etc., and internal power lines 106A-C that run from the common area 110 to the units 120A-C, and that are bundled through a tube 122. The common area 110 may include mains power lines 104A-C that are coupled to the common power line 102, mini-circuit breakers (MCBs) 115A-C, filters 150A-C, primary devices 130A-C, and a management entity 160. The units 120A-C may include mini-circuit breakers (MCBs) 125A-C, and secondary devices 140A-C.

The mains power lines 104A-C, the internal power lines 106A-C, and the common power line 102 may be any cables or wires that can carry electricity, such as wires made of copper or other conductors, and may be referred to as power cables, power lines, electrical power lines, electrical wiring, electrical cabling, etc. The mains power lines 104A-C, the internal power lines 106A-C, and/or the common power line 102 may each include multiple wires that can carry current, such as a live wire, a neutral wire, and/or a ground wire that may also be referred to as a protective earth wire. For example, the mains power lines 104A-C, the internal power lines 106A-C, and/or the common power line 102 may each include a live wire that carries an electrical current from the electricity source, such as an electrical provider, and a neutral wire that provides the return path for the electrical current. The tube 122 may be any conduit that is capable of routing the internal power lines 106A-C from the common area 110 to the units 120A-C. Since the internal power lines 106A-C are proximally located within the tube, the PLC signals transmitted over one of the power lines 106A-C, such as the internal power line 106A, may be electromagnetically coupled onto the other power lines 106B-C.

The MCBs 115A-C, 125A-C may be any circuit breakers, e.g. automatically operated electrical switches designed to protect electrical circuits from damage caused by overload or short circuit. The basic function of the MCBs 115A-C, 125A-C may be to detect a fault condition and interrupt current flow. Once triggered, the MCBs 115A-C, 125A-C can be reset (either manually or automatically) to resume normal operation.

The primary devices 130A-C and the secondary devices 140A-C may be any devices that are capable of coupling a data signal onto the internal power lines 106A-C, such as power line communication devices or power line modems. For example, the primary devices 130A-C and the secondary devices 140A-C may each be configured to impress a modulated carrier signal onto the internal power lines 106A-C. The primary devices 130A-C and the secondary devices 140A-C may use different carrier frequencies to communicate with one another, e.g. depending on the signal transmission characteristics of the internal power lines 106A-C. The carrier frequencies may differ from the power frequency current, e.g. 50-60 Hertz. In one or more implementations, the primary devices 130A-C and the secondary devices 140A-C may transmit symmetrical differential power line communication signals across multiple wires, e.g. across a live wire and a neutral wire. Thus, a first power line communication signal may be transmitted over the live wire and a second power line communication signal that is an inverse of the first signal may be transmitted over the neutral wire, e.g. the first and second signals may have opposite phases. Any of the primary devices 130A-C and/or the secondary devices 140A-C may have a transmission port that is shared with an alternating current (AC) power port. In one or more implementations, the primary devices 130A-C may be communicatively coupled to an Internet connection, and the secondary devices 140A-C may be communicatively coupled to local area networks within the units 120A-C.

Since the primary devices 130A-C each share a common AC feeding point, e.g. the common power line 102, the power line communication signals transmitted/received by the primary devices 130A-C may interfere with one another, e.g. by leaking out to the common power line 102 and/or the mains power lines 104A-C. However, any such interference can be mitigated by implementing the filters 150A-C that block the power line communication signals while allowing AC power to pass through.

In one or more implementations, the primary devices 130A-C may be communicatively coupled, e.g. via power line interfaces coupled to the power lines 106A-C, and/or via another interface, such as via an Ethernet interface. The primary devices 130A-C may also be communicatively coupled to the management entity 160, e.g. via power line interfaces coupled to the power lines 106A-C, and/or via another interface, such as via an Ethernet interface. In one or more implementations, the primary devices 130A-C may be PLC transceivers within a single enclosure, e.g. on a single printed circuit (PCB), on one or more line cards, etc. Thus, the primary devices 130A-C may be communicably coupled, and/or communicably coupled to management entity 160, via a transmission line on a PCB, a bus interconnect, or the like.

In one or more implementations, the management entity 160 may be a separate device from the primary devices 130A-C, or the management entity 160 may be included within one or more of the primary devices 130A-C. In one or more implementations, the primary devices 130A-C may each be configured to perform the functions of the management entity 160, and one of the primary devices 130A-C may be selected to function as the management entity 160 for the example network environment 100. For example, at initialization, or any time thereafter, the primary devices 130A-C may dynamically select the primary device 130A to function as the management entity 160, such as by electing the primary device 130A, determining that the primary device 130A is best suited to function as the management entity 160, etc. For explanatory purposes, the management entity 160 is discussed herein with reference to coordinating the transmissions of the primary devices 130A-C. However, the management entity 160 and/or a separate management entity (not shown) may also coordinate the transmissions of the secondary devices 140A-C, e.g. when the secondary devices 140A-C can be coupled to one another and/or to the management entity 160.

In operation, the primary devices 130A-C may form PLC networks with the secondary devices 140A-C, respectively, over the internal power lines 106A-C, respectively. Thus, the primary device 130A may transmit/receive first PLC signals to/from the secondary device 140A over the internal power line 106A, e.g. forming a first local PLC network, the primary device 130B may transmit/receive second PLC signals to/from the secondary device 140B over the internal power line 106B, e.g. forming a second local PLC network, and the primary device 130C may transmit/receive third PLC signals to/from the secondary device 140C over the internal power lines 106C, e.g. forming a third local PLC network. The first, second, and third local PLC networks may be configured to be independent of each other; however the PLC signals transmitted over one or more of the internal power lines 106A-C corresponding to the first, second, and third local PLC networks may be electromagnetically coupled to one or more other of the internal power lines 106A-C, thereby causing far-end crosstalk (FEXT) interference. In one or more implementations, one or more of the local PLC networks may experience cyclo-stationary variability of channel conditions and time intervals may be used, e.g. for transmission of PLC signals, during which the channels have pseudo-homogenous properties.

The management entity 160 may coordinate the transmissions of the primary devices 130A-C in order to compensate for the FEXT interference. The management entity 160 may receive channel state information from the primary devices 130A-C. For example, each of the secondary devices 140A-C may determine channel state information, such as channel impulse responses, with respect to the primary devices 130A-C and may transmit the channel state information to the primary devices 130A-C. The primary devices 130A-C may then provide the channel state information to the management entity 160. The management entity 160 may generate a channel matrix H that contains complex channel transfer coefficients, based at least in part on the channel state information received from the primary devices 130A-C. The channel matrix may be indicative of the channel conditions between the primary devices 130A-C and the secondary devices 140A-C, e.g. the channel matrix may be indicative of the FEXT experienced by the secondary devices 140A-C, such as the FEXT experienced by the secondary device 140A as a result of transmissions by the primary devices 130B-C. Thus, if y represents a vector of symbols received by the secondary devices 140A-C on a given carrier frequency for a given symbol period, and x represents a vector of symbols transmitted by the primary devices 130A-C on the given carrier frequency for the given symbol period, the relationship between x and y can be expressed as y=Hx+n, with n representing additive Gaussian noise. The FEXT experienced by the secondary devices 140A-C is discussed further below with respect to FIG. 5.

The management entity 160 determines precoding information, such as a precoding matrix P, that allows the primary devices 130A-C to compensate for and/or avoid the FEXT interference. For example, the management entity 160 may determine a precoding matrix P as $P=H^{-1}$, where H is the channel matrix, and the full path from the primary devices 130A-C to the secondary devices 140A-C is represented as HP=I, with I being the identity matrix. For explanatory purposes, the channel precoding matrix is described herein with reference to a single carrier frequency; however, it will be understood that the subject system may determine different precoding matrices for different carrier frequencies and/or different subcarriers that are used to transmit signals over the power lines 106A-C.

The management entity 160 provides the precoding information to the primary devices 130A-C, such as the precoding matrix P, or a portion thereof, such as a vector that contains a row of the precoding matrix. In one or more implementations, the management entity 160 may also synchronize the transmission periods, such as symbol periods, of the primary devices 130A-C. The management entity 160 is discussed further below with respect to FIG. 2, and an example process of the management entity 160 is discussed further below with respect to FIG. 3.

The primary devices 130A-C receive the precoding information from the management entity 160 and use the precoding information to adjust to be transmitted signals, such as to compensate for, and/or avoid, the FEXT interference being experienced by the secondary devices 140A-C. For example, the primary devices 130A-C may each receive a precoding vector and may apply the precoding vector to symbols before the symbols are transmitted. In one or more implementations, the primary devices 130A-C may communicate the symbols to one another before the symbols are transmitted. The primary devices 130A-C may then use the precoding vectors to compensate for the FEXT interference that will be caused by the transmission of the symbols of the other primary devices 130A-C, such as by pre-subtracting the expected FEXT interference. Thus, when the transmitted PLC signals experience the FEXT interference, the pre-subtracted FEXT interference may be destructively superimposed on the FEXT interference, thereby negating the experienced FEXT interference. Thus, the PLC signals received by the secondary devices 140A-C will be minimally impacted by the FEXT interference. In one or more implementations, the precoding information may allow one or more of the primary devices 130A-C to implement orthogonal beamforming, such as eigen beamforming, to avoid the FEXT interference. An example primary device 130A is discussed further below with respect to FIG. 2 and an example process of the example primary device 130A is discussed further below with respect to FIG. 3.

For explanatory purposes, the example power line network environment 100 of FIG. 1 is illustrated and discussed in the context of the units 120A-C that are located within a building 105. However, the subject system for coordinating transmissions of power line communication devices is not limited to units 120A-C that are located within a common building 105. The subject system for coordinating transmissions across power line communication devices may be in any environment where multiple primary devices 130A-C are collocated and/or multiple secondary devices 140A-C are collocated, such that the transmissions of the multiple primary devices 130A-C and/or the multiple secondary devices 140A-C may be managed by the management entity 160. For example, the secondary devices 140A-C may be located in separate buildings, such as separate houses, and the primary devices 130A-C may be collocated, such as in a utility box.

Figure 2:
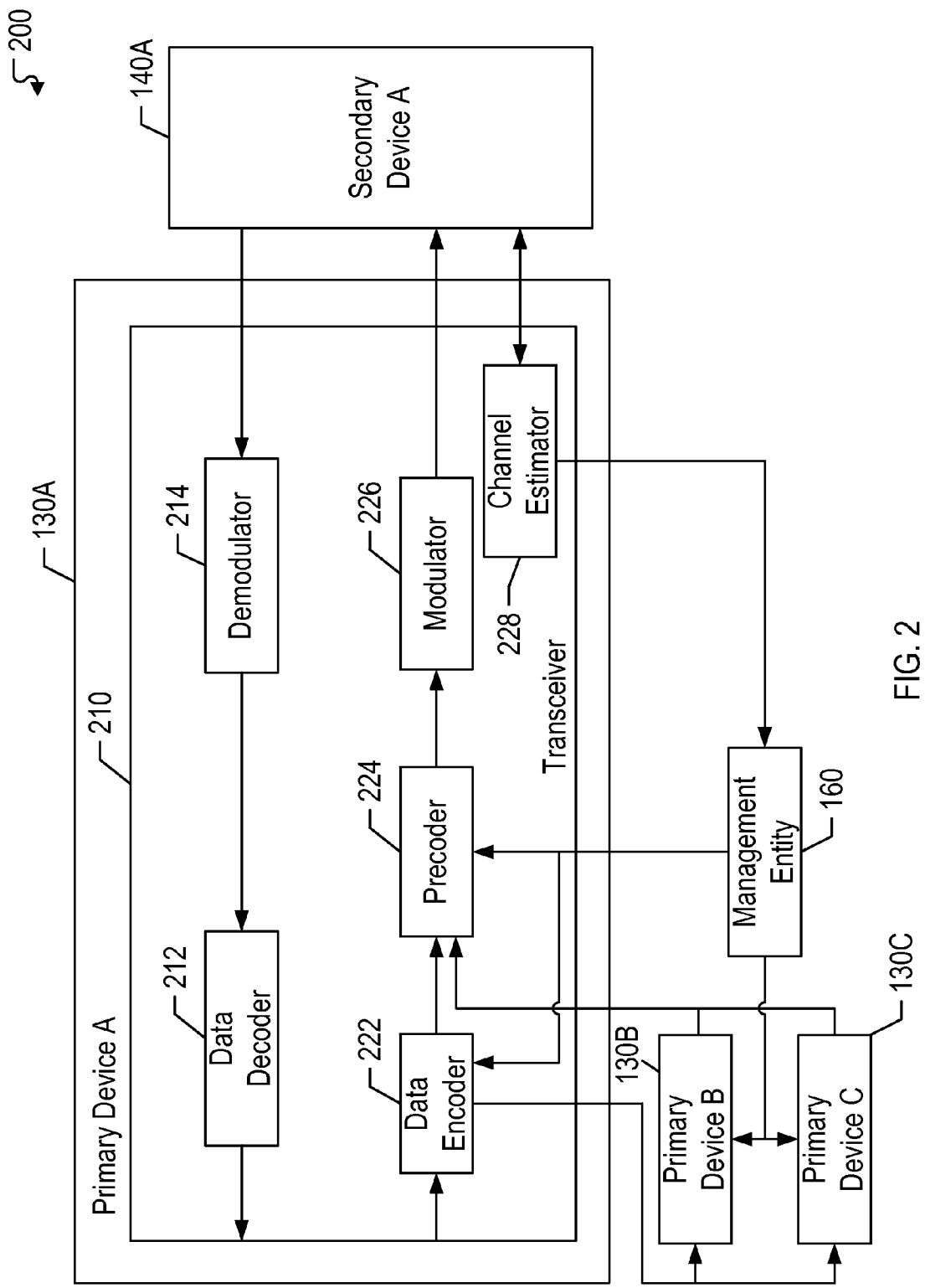
FIG. 2 illustrates an example power line network environment in which a system for coordinating transmissions of power line communication (PLC) devices may be implemented in accordance with one or more implementations.

FIG. 2 illustrates an example power line network environment 200 in which a system for coordinating transmissions of power line communication (PLC) devices may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example power line network environment 200 includes primary devices 130A-C, secondary device 140A, and management entity 160. The primary device 130A includes a PLC transceiver 210. The PLC transceiver 210 includes a data encoder 222, a precoder 224, a modulator 226, a channel estimator 228, a demodulator 214, and a data decoder 212.

At initialization (and/or any time thereafter), the primary device 130A, and the primary devices 130B-C may transmit pilot symbols to the secondary devices 140A-C such that the secondary devices 140A-C, such as the secondary device 140A, may determine channel impulse responses with respect to the transmissions received from the primary devices 130A-C. The pilot symbols and/or pilot symbol sequences transmitted by the different primary devices 130A-C may be orthogonal such that the secondary device 140A may correlate received pilot symbols to one of the primary devices 130A-C. Although the secondary device 140A is not directly coupled to the primary devices 130B-C, the secondary device 140A may still receive signals from the primary devices 130B-C due to the electromagnetic coupling between the internal power lines 106A-C.

The secondary device 140A may provide the channel estimator 228 of the primary device 130A with channel state information, such as a channel impulse responses, with respect to the pilot symbols received from the primary devices 130A-C. Similarly, the secondary devices 140B-C may provide channel state information to the primary devices 130B-C. The channel estimator 228 of the primary device 130A, as well as channel estimators of the primary devices 130B-C, provides the channel state information to the management entity 160. Thus, the management entity 160 may use the channel state information, such as channel impulse responses, received from the primary devices 130A-C to generate the channel matrix H. The management entity may use the channel matrix H to determine a precoding matrix P, such as $P=H^{-1}$. The management entity 160 may provide the precoding matrix P to the precoder 224 of the primary device 130A, as well as precoders of the primary devices 130B-C. In one or more implementations, the management entity may provide a portion of the precoding matrix P to the precoder 224, such as an L×1 vector (L being the number of primary devices 130A-C) that contains a row of precoding values of the precoding matrix P that correspond to the channel state information associated with the secondary device 140A.

The data encoder 222 receives data to be transmitted to the secondary device 140A and encodes the data into symbols, such as quadrature amplitude modulation (QAM) symbols. The data encoder 222 may receive a clock signal from the management entity 160, or may be otherwise synchronized with data encoders of the primary devices 130B-C by the management entity 160. In one or more implementations, the data encoder 222 may provide the symbols to the precoder 224 of the primary device 130A, as well as the precoders of the primary devices 130B-C. Similarly, the data encoders of the primary devices 130B-C may provide to be transmitted symbols to the precoder 224 of the primary device 130A. In one or more implementations, the primary devices 130A-C may not be coupled, and may not provide to be transmitted symbols to one another. For example, the management entity 160 may provide a unitary matrix, and/or a portion thereof, to one or more of the primary devices 130A-C, and the primary devices 130A-C may precode symbols based at least in part on the unitary matrix.

The precoder 224 applies the precoding information, such as the portion of the precoding matrix relevant to the secondary device 140A (the aforementioned precoding vector) and applies the precoding information to the symbols to be transmitted by the primary devices 130A-C in order to precode the symbol to be transmitted by the primary device 130A. For example, the precoder 224 may multiply a vector that contains the symbols to be transmitted by the primary devices 130A-C to the precoding vector. Thus, the precoder 224 admixes the symbols of the signals to be transmitted by the primary devices 130B-C, in the correct phase, into the signal being transmitted by the primary device 130A, so that the admixed signals are destructively superimposed on the crosstalk, thereby effectively cancelling the crosstalk. The modulator 226 modulates precoded symbols and provides modulated precoded symbols for transmission over the internal power line 106A to the secondary device 140A.

The demodulator 214 demodulates modulated symbols received from the secondary device 140A, e.g. via the internal power line 106A, and provides the demodulated symbols to the data decoder 212. The data decoder 212 decodes the symbols and provides the decoded data for upstream processing, e.g. to a baseband processor.

Figure 3:
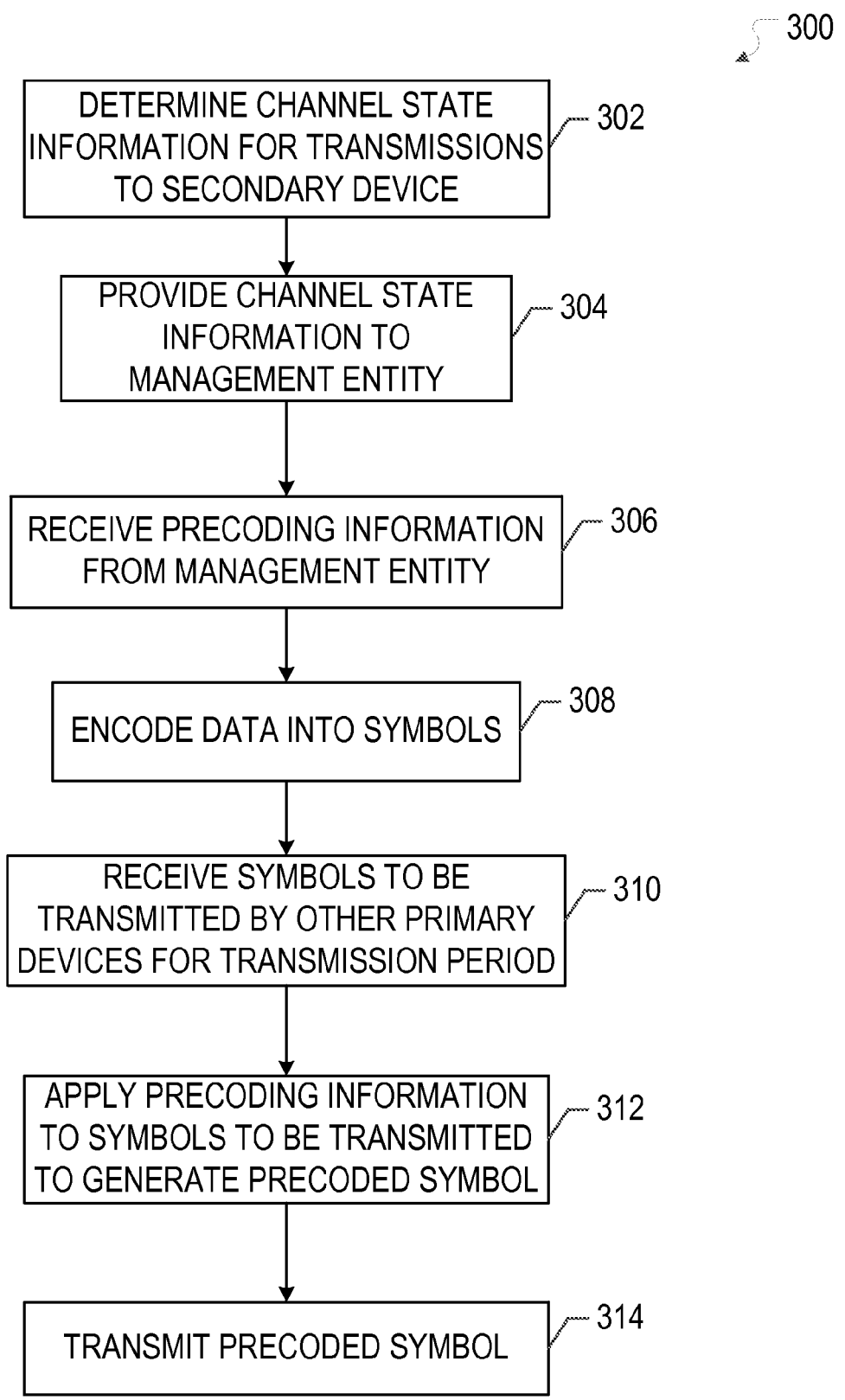
FIG. 3 illustrates a flow diagram of an example process of a power line communication (PLC) device in a system for coordinating transmissions of power line communication (PLC) devices in accordance with one or more implementations.

FIG. 3 illustrates a flow diagram of an example process 300 of a primary device 130A in a system for coordinating transmissions of power line communication (PLC) devices 130A-C, 140A-C in accordance with one or more implementations. For explanatory purposes, the example process 300 is described herein primarily with reference to the primary device 130A of FIGS. 1 and 2; however, the example process 300 is not limited to the primary device 130A of FIGS. 1 and 2, and the example process 300 may be performed by one or more components of the primary device 130A. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed. In one or more implementations, the example process 300 may be performed by one or more of the PLC devices 130A-C, 140A-C.

The example process 300 is provided for explanatory purposes, e.g. to explain an example precoding mechanism that may be utilized by the primary devices 130A-C and/or the secondary devices 140A-C to compensate for, and/or avoid, crosstalk in accordance with one or more implementations. However, the precoding mechanism utilized by the primary devices 130A-C and/or the secondary devices 140A-C is not limited to the example process 300. The primary devices 130A-C and/or the secondary devices 140A-C may utilize any precoding mechanism, such as any multiple input multiple output (MIMO) precoding mechanism, and/or any other technique that may facilitate compensating for, and/or avoiding, crosstalk, such as vectoring, in accordance with one or more implementations.

The primary device 130A determines channel state information for transmissions from the primary devices 130A-C to the secondary device 140A (302). For example, the secondary device 140A may transmit channel impulse responses, and/or other channel state information, to the primary device 130A, e.g. via in-band or out-of-band transmissions. Although the secondary device 140A is not coupled to the primary devices 130B-C, the secondary device 140A may receive signals from the primary devices 130B-C due to electromagnetic coupling between the power lines 106A-C.

The primary device 130A provides the channel information to the management entity 160 (304). For example, the primary device 130A may be communicably coupled to the management entity 160 via one or more of the power lines 106A-C, and/or via another communication medium. The primary device 130A receives precoding information, such as a precoding matrix or a portion thereof, such as a precoding vector, from the management entity 160 (306). The primary device 130A, such as the data encoder 222, encodes data into symbols, such as QAM symbols (308). The primary device 130A, such as the precoder 224, receives symbols to be transmitted by the other primary devices 130B-C during the symbol period associated with the encoded symbols (310).

The primary device 130A, such as the precoder 224, applies the precoding information to the symbols to be transmitted by the primary devices 130A-C in order to precode the symbol to be transmitted by the primary device 130A, e.g. to pre-compensate for crosstalk expected to be caused by the symbols transmitted by the other primary devices 130B-C (312). The primary device 130A modulates the precoded symbol and transmits the modulated symbol to the secondary device 140A via the internal power line 106A (314).

Figure 4:
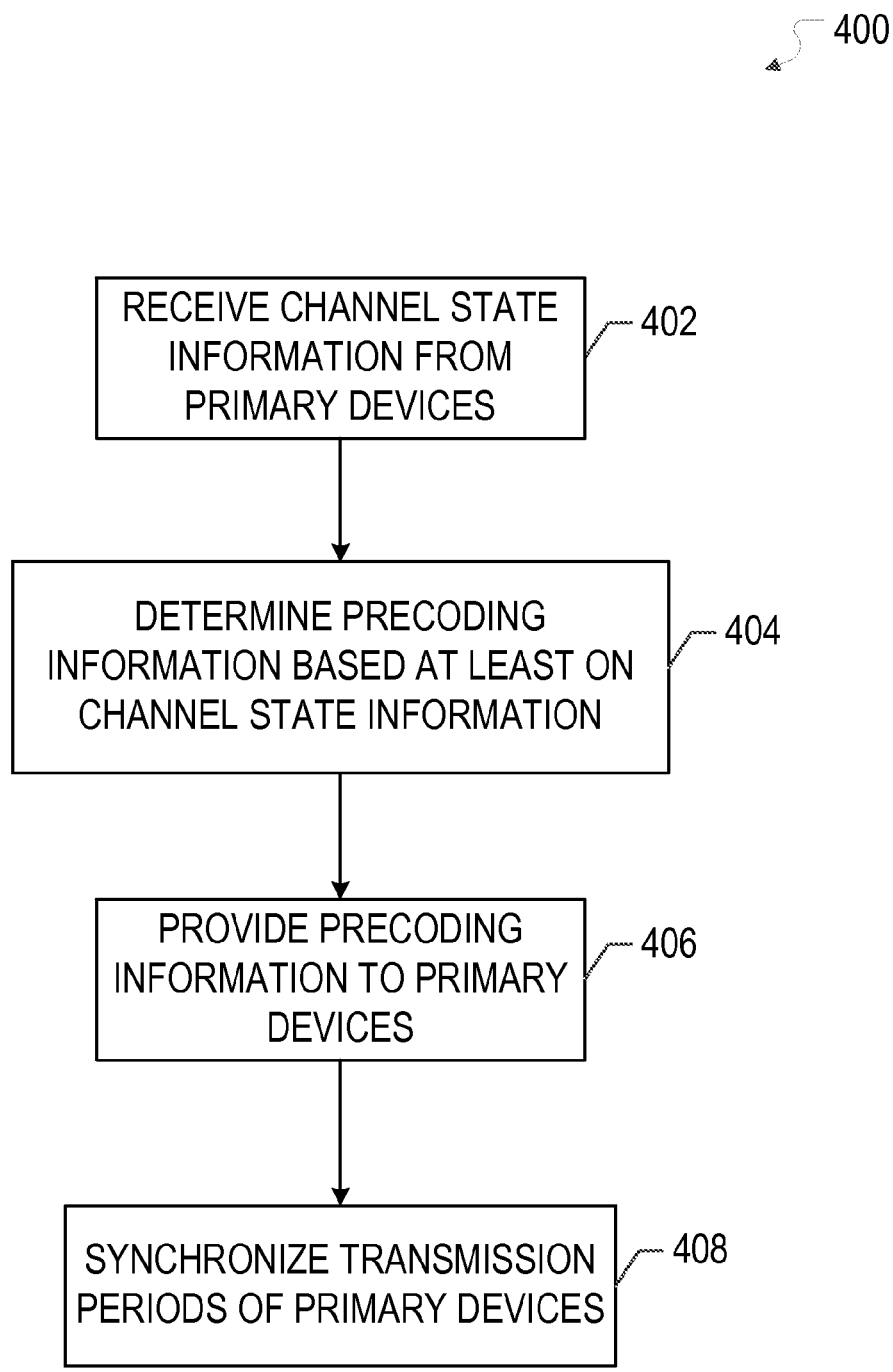
FIG. 4 illustrates a flow diagram of an example process of a management entity in a system for coordinating transmissions of power line communication (PLC) devices in accordance with one or more implementations.

FIG. 4 illustrates a flow diagram of an example process 400 of a management entity 160 in a system for coordinating transmissions of power line communication (PLC) devices 130A-C, 140A-C in accordance with one or more implementations. For explanatory purposes, the example process 400 is described herein primarily with reference to the management entity 160 of FIGS. 1 and 2; however, the example process 400 is not limited to the management entity 160 of FIGS. 1 and 2, and the example process 400 may be performed by one or more components of the management entity 160. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed. In one or more implementations, the management entity 160 may be, or may be part of, one or more of the PLC devices 130A-C, 140A-C, and the example process 400 may be performed by one or more of the PLC devices 130A-C, 140A-C.

The example process 400 is provided for explanatory purposes, e.g. to explain facilitation of the management entity 160 with implementing an example precoding mechanism in accordance with one or more implementations. However, the precoding mechanism facilitated by the management entity 160 is not limited to the example process 400. The management entity 160 may facilitate with any precoding mechanism, such as any multiple input multiple output (MIMO) precoding mechanism, and/or any other technique that may facilitate compensating for, and/or avoiding, crosstalk, such as vectoring, in accordance with one or more implementations.

The management entity 160 receives channel state information from the primary devices 130A-C (402). For example, the primary devices 130A-C may receive channel state information from the secondary devices 140A-C and may then provide the channel state information to the management entity 160. The management entity 160 may use the received channel state information to generate a channel matrix H. The management entity 160 determines the precoding information, such as a precoding matrix P, for the primary devices 130A-C based at least on the channel state information, such as by generating the inverse of the channel matrix, by performing a singular value decomposition on the channel matrix, and/or any similar mechanism (404).

The management entity 160 provides the precoding information to the primary devices 130A-C (406). In one or more implementations, the management entity 160 may provide the entire precoding matrix to each of the primary devices 130A-C. In one or more implementations, the management entity 160 provides different portions of the precoding matrix, e.g. different precoding vectors, to the primary devices 130A-C. For example, the management entity 160 may provide the primary device 130A with a precoding vector that contains the values of a row or column of the precoding matrix that correspond to the channels or paths between the primary devices 130A-C and the secondary device 140A. Similarly, the management entity 160 may provide the primary device 130B with a precoding vector that contains the values of a row or column of the precoding matrix that correspond to the channels or paths between the primary devices 130A-C and the secondary device 140B, etc. The management entity 160 synchronizes the data encoders 222 of the primary devices 130A-C, in order to ensure that the signals transmitted by the devices 130A-C are temporally synchronized and that the crosstalk is effectively cancelled (408).

Figure 5:
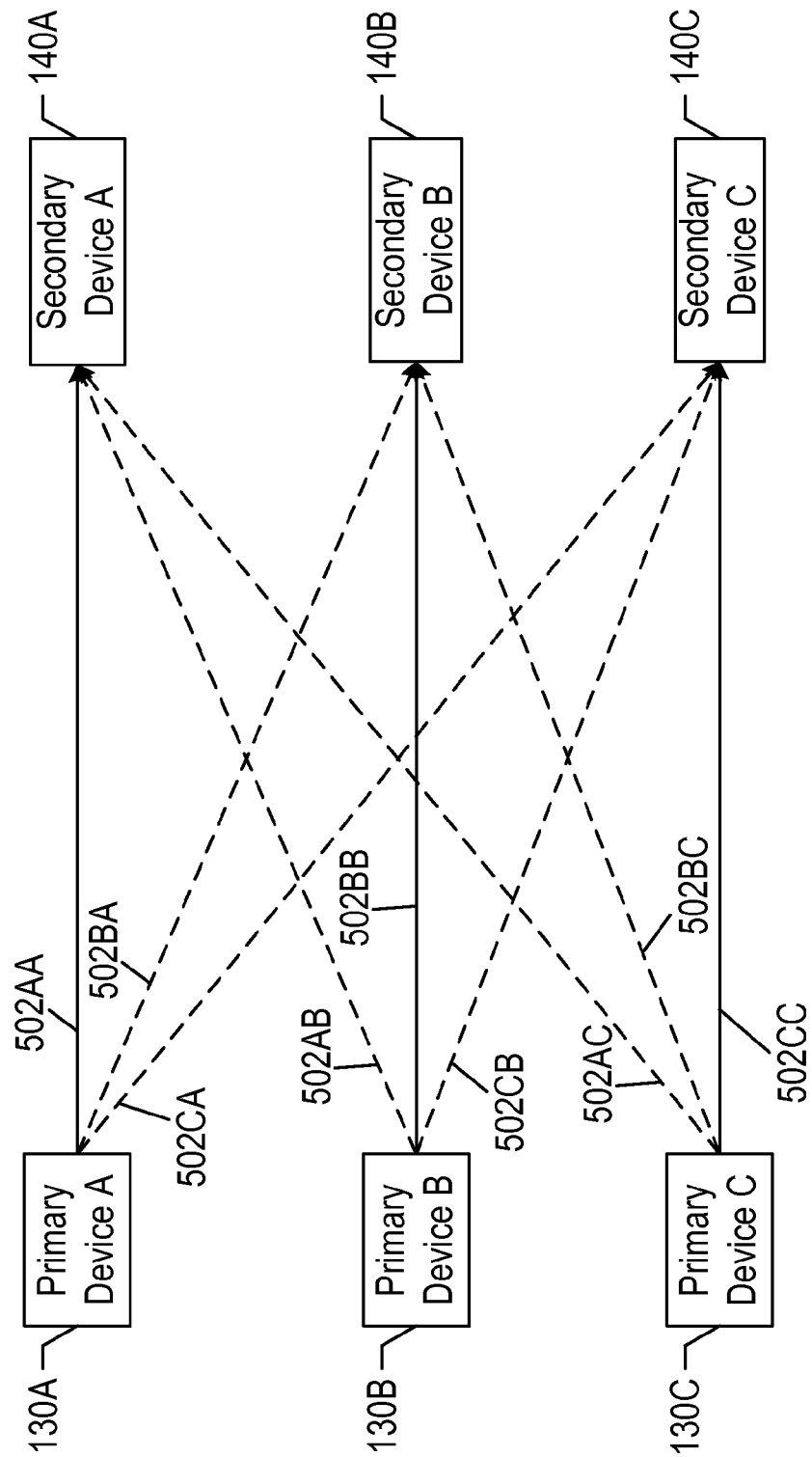
FIG. 5 illustrates example signal paths in a system for coordinating transmissions of power line communication (PLC) devices in accordance with one or more implementations.

FIG. 5 illustrates example signal paths in a system for coordinating transmissions of power line communication (PLC) devices in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 5, signals transmitted by the primary device 130A to the secondary device 140A over the internal power line 106A have a signal path 502AA. Although the primary device 130A is not directly coupled to the secondary devices 140B-C, the signal transmitted by the primary device 130A over the internal power line 106A is coupled onto the internal power lines 106B-C, e.g. due to the proximity of the internal powers lines 106A-C in the tube 122, and transmitted signal propagates along signal paths 502AB, 502AC to the secondary electronic devices 140B-C, respectively. Similarly, a signal transmitted by the primary device 130B on the internal power line 106B propagates to secondary device 140A via signal path 502BA, to secondary device 140B via signal path 502BB, and to secondary device 140C via signal path 502BC. Lastly, a signal transmitted by the primary device 130C on the internal power line 106C propagates to the secondary device 140A via the signal path 502CA, to the secondary device 140B via the signal path 502CB, and to the secondary device 140C via signal path 502CC.

Thus, the channel matrix H for the signal paths 502AA-CC between the primary electronic devices 130A-C and the secondary electronic devices 140A-C may be represented as follows, with $h_x(f)$ representing the complex channel transfer coefficient (e.g. as determined by the channel impulse responses) for x signal path:

$$H = \begin{bmatrix} h_{502AA}(f) & h_{502AB}(f) & h_{502AC}(f) \\ h_{502BA}(f) & h_{502BB}(f) & h_{502BC}(f) \\ h_{502CA}(f) & h_{502CB}(f) & h_{502CC}(f) \end{bmatrix}$$

Thus, the first row of H is indicative of the channels from the primary devices 130A-C to the secondary device 140A, the second row is indicative of the channels from the primary devices 130A-C to the secondary device 140B, and the third row is indicative of the channels from the primary devices 130A-C to the secondary devices 140C.

The rows of the corresponding precoding matrix P that is generated by the management entity 160 are similarly arranged. Thus, the first row of the precoding matrix may be utilized by the primary device 130A to precode signals being transmitted to the secondary device 140A, e.g. in order to account for the crosstalk from the signals transmitted by the primary devices 130B-C. The second row of the precoding matrix may be utilized by the primary device 130B to precode signals being transmitted to the secondary device 140B, e.g. in order to account for the signals transmitted by the primary devices 130A,C, etc. Thus, the precoding vector transmitted by the management entity 160 to the primary device 130A may include the values of the first row of the precoding matrix, the precoding vector transmitted by the management entity 160 to the primary device 130B may include the second row of the precoding matrix, etc.

Figure 6:
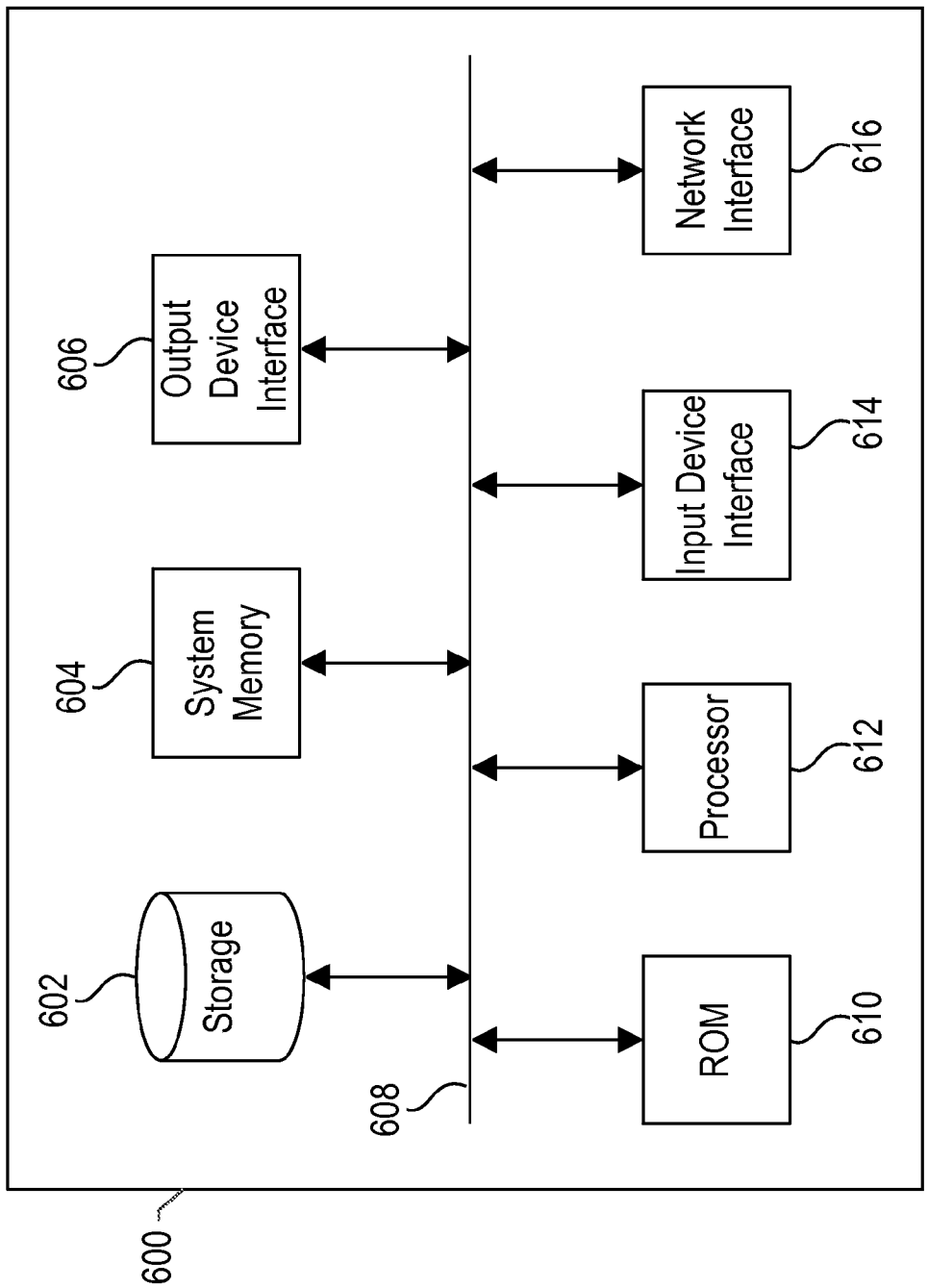
FIG. 6 conceptually illustrates an electronic system with which one or more implementations of the subject technology may be implemented.

FIG. 6 conceptually illustrates an electronic system 600 with which one or more implementations of the subject technology may be implemented. The electronic system 600, for example, can be a PLC modem, a PLC adapter, a desktop computer, a laptop computer, a set-top box, a television, a server, a switch, a router, a base station, receiver, or generally any electronic device that can be coupled to a power line communication network. Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, a network interface 616, or subsets and variations thereof. In one or more implementations, one or more of the primary devices 130A-C, the secondary devices 140A-C, and/or the management entity 160 may be, or may include all or part of, the electronic system 600.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and/or the permanent storage device 602. From these various memory units, the one or more processing unit(s) 612 retrieve instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system. The permanent storage device 602, on the other hand, is a read-and-write memory device. The permanent storage device 602 is a non-volatile memory unit that stores instructions and data even when the electronic system 600 is off. One or more implementations of the subject disclosure use a mass-storage device (such as a magnetic or optical disk and its corresponding disk drive) as the permanent storage device 602.

Other implementations use a removable storage device (such as a floppy disk, flash drive, and its corresponding disk drive) as the permanent storage device 602. Like the permanent storage device 602, the system memory 604 is a read-and-write memory device. However, unlike the permanent storage device 602, the system memory 604 is a volatile read-and-write memory, such as random access memory. The system memory 604 stores any of the instructions and data that the one or more processing unit(s) 612 needs at runtime. In one or more implementations, the processes of the subject disclosure are stored in the system memory 604, the permanent storage device 602, and/or the ROM 610. From these various memory units, the one or more processing unit(s) 612 retrieve instructions to execute and data to process in order to execute the processes of one or more implementations.

The bus 608 also connects to an input device interface 614 and an output device interface 606. The input device interface 614 enables a user to communicate information and select commands to the electronic system. Input devices used with the input device interface 614 include, for example, alphanumeric keyboards and pointing devices (also called "cursor control devices"). The output device interface 606 enables, for example, the display of images generated by the electronic system 600. Output devices used with the output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touch screen. In these implementations, feedback provided to the user can be any form of sensory feedback, such as visual feedback, auditory feedback, or tactile feedback; and input from the user can be received in any form, including acoustic, speech, or tactile input.

The bus 608 also couples the electronic system 600 to a network (not shown), such as a PLC network, through the network interface 616. In this manner, the computer can be a part of a network of computers (such as a local area network ("LAN"), a wide area network ("WAN"), or an Intranet, or a network of networks, such as the Internet. The bus 608 may further couple the electronic system 600 to one or more other interfaces (not shown), such as interfaces that communicably couple the electronic system 600 to one or more primary devices 130A-C and/or to the management entity 160, and/or interfaces that couple the electronic system 600 to an external device, such as an Ethernet interface. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for coordinating transmissions of power line communication (PLC) devices, the method comprising:
    receiving, by a management entity communicatively coupled to a plurality of primary PLC devices, channel state information from the plurality of primary PLC devices with respect to transmissions to a plurality of secondary PLC devices, each of the plurality of secondary PLC devices being coupled to one of the plurality of primary PLC devices via one of a plurality of power lines;
    determining, by the management entity, precoding information for mitigating far-end cross talk interference associated with the transmissions from the plurality of primary PLC devices to the plurality of secondary PLC devices;
    providing, by the management entity, a separate portion of the preceding information to each of the plurality of primary PLC devices; and
    coordinating, by the management entity, preceded transmissions of the plurality of primary PLC devices to the plurality of secondary PLC devices.

2. The method of claim 1, wherein the precoding information comprises a precoding matrix, and the method further comprising:
    determining a channel matrix based at least on the received channel state information; and
    determining the precoding matrix based at least on the channel matrix.

3. The method of claim 2, wherein the separate portion of the precoding information comprises a vector comprising a row of the precoding matrix.

4. The method of claim 2, wherein the precoding matrix is an inverse of the channel matrix.

5. The method of claim 1, wherein the plurality of power lines are at least partially bundled in a conduit between the plurality of primary PLC devices and the plurality of secondary PLC devices, wherein the precoded transmissions on one of the plurality of power lines are electromagnetically coupled onto at least one other of the plurality of power lines causing the far-end cross talk interference on the at least one other of the plurality of power lines.

6. The method of claim 1, wherein coordinating the precoded transmissions of the plurality of primary PLC devices to the plurality of secondary PLC devices comprises:
    providing a clock signal to encoders of the plurality of primary PLC devices.

7. The method of claim 1, wherein each of the plurality of secondary PLC devices is exclusively coupled to the one of the plurality of primary PLC devices via the one of a plurality of power lines.

8. The method of claim 1, wherein coordinating the transmissions of the plurality of primary PLC devices to the plurality of secondary PLC devices comprises synchronizing symbol periods of the plurality of primary PLC devices.

9. A primary power line communication (PLC) device comprising:
    an interface that is configured to provide channel state information to a management entity and to receive precoding information from the management entity;
    a precoder that is configured to precode first symbols for transmission to a secondary PLC device based at least on the precoding information; and
    a power line interface that is configured to transmit the precoded first symbols to the secondary PLC device via a first power line.

10. The primary PLC device of claim 9, wherein the power line interface is further configured to receive the channel state information from the secondary PLC device, the channel state information pertaining to the primary PLC communication device and at least one other primary PLC device.

11. The primary PLC device of claim 10, wherein the interface is further configured to receive second symbols from the at least one other primary PLC device.

12. The primary PLC device of claim 11, wherein the at least one other primary PLC device is configured to transmit the second symbols to another secondary PLC device via a second power line.

13. The primary PLC of claim 12, wherein the first power line and the second power line are at least partially bundled together and the second symbols are electromagnetically coupled onto the first power line.

14. The primary PLC device of claim 11, wherein the precoder is configured to precode the first symbols based at least on the received precoding information and the received second symbols.

15. The primary PLC device of claim 11, further comprising:
    a data encoder for encoding data into the first symbols.

16. The primary PLC device of claim 15, wherein the interface is configured to receive a synchronization signal from the management entity, and the data encoder is configured to encode the data into the first symbols based at least on the synchronization signal.

17. A system comprising:
    a management entity, communicatively coupled to a first PLC device and a second PLC device, the management entity being configured to receive first and second channel state information from the first and second PLC devices, respectively, determine a precoding matrix based at least on the received first and second channel state information, and provide a first portion of the precoding matrix to the first PLC device and a second portion of the precoding matrix to the second PLC device; and
    the first PLC device that is communicatively coupled to the second PLC device and that is configured to provide the first channel state information to the management entity, receive the first portion of the precoding matrix from the management entity, receive second symbols from the second PLC device, precode first symbols based at least on the second symbols and the first portion of the precoding matrix, and transmit the precoded first symbols to a third PLC via a first power line.

18. The system of claim 17, further comprising:
    the second PLC device that is configured to provide the second channel state information to the management entity, receive the second portion of the precoding matrix from the management entity, receive the first symbols from the first PLC device, precode the second symbols based at least on the first symbols and the second portion of the precoding matrix, and transmit the precoded second symbols to a fourth power line communication device via a second power line, the second power line being collocated with the first power line, wherein the transmitted first symbols are electromagnetically coupled onto the second power line and the transmitted second symbols are electromagnetically coupled onto the first power line.

19. The system of claim 18, wherein the first channel state information is associated with the first precoded symbols that are transmitted on the first power line and the second precoded symbols that are electromagnetically coupled onto the first power line.

20. The system of claim 19, wherein the first power line communication device comprises the management entity and the first and second power lines are at least partially bundled together in a conduit.

\* \* \* \* \*